US012746507B2

(12) United States Patent

Nelson et al.

(10) Patent No.: US 12,746,507 B2

(45) Date of Patent: Sep. 29, 2026

(54) CARBON CAPTURE ENTRAINMENT SYSTEM AND METHOD

(71) Applicant: Purdue Research Foundation, West Lafayette, IN (US)

(72) Inventors: Clarice E. Nelson, Valparaiso, IN (US); Venkatesh Pulletikurthi, West Lafayette, IN (US); Helber Antonio Esquivel-Puentes, Lafayette, IN (US); Luciano Castillo, Carmel, IN (US); Maria Mirian Velay Lizancos, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 308 days.

(21) Appl. No.: 18/514,599

(22) Filed: Nov. 20, 2023

(65) Prior Publication Data

US 2025/0144564 A1 May 8, 2025

Related U.S. Application Data

(60) Provisional application No. 63/426,888, filed on Nov. 21, 2022.

(51) Int. Cl.

*B01D 53/02* (2006.01)
*B01D 53/34* (2006.01)

(Continued)

(52) U.S. Cl.

CPC ........... *B01D 53/62* (2013.01); *B01D 53/346* (2013.01); *F03D 9/30* (2016.05); *B01D 2221/16* (2013.01);

(Continued)

(58) Field of Classification Search

CPC .......... B01D 2221/16; B01D 2257/504; B01D 2258/06; B01D 53/346; B01D 53/62; F03D 7/049; F03D 9/30

See application file for complete search history.

(56) References Cited

U.S. PATENT DOCUMENTS 11,701,616 B2 * 7/2023 Dehlsen ............... B01D 53/185 210/321.72
2021/0362094 A1 * 11/2021 Dehlsen ............... B01D 61/081

(Continued)

OTHER PUBLICATIONS

Gadde, Srinidhi, N., et al., "Effect of low-level jet height on wind farm performance", Journal of Renewable and Sustainable Energy, (2021), vol. 13, No. 1, p. 013305, 12 pages. https://doi.org/10.1063/5.0026232.

(Continued)

*Primary Examiner* — Christopher P Jones

(74) *Attorney, Agent, or Firm* — Purdue Research Foundation

(57) ABSTRACT

The carbon capture system includes a wind turbine, a direct-air capture (DAC) system, and a processor. The wind turbine has a first location and/or a first position. The processor is communicatively coupled to the DAC system. The processor is configured to input a wind turbine wake from the wind turbine and/or incident carbon dioxide profile, execute an algorithm to determine a wind velocity and/or a concentration of the carbon dioxide in the wind turbine wake, and output a second location and/or a second position of the DAC system. The second location and/or the second position of the DAC system is optimized to enhance the quantity of carbon dioxide captured from to the wind turbine.

20 Claims, 11 Drawing Sheets

(51) Int. Cl.
*B01D 53/62* (2006.01)
*F03D 9/30* (2016.01)

(52) U.S. Cl.
CPC .... *B01D 2257/504* (2013.01); *B01D 2258/06* (2013.01)

(56) References Cited

U.S. PATENT DOCUMENTS

| | | | | |
|---|---|---|---|---|
| 2022/0362737 | A1* | 11/2022 | Staufcik | B01D 53/185 |
| 2023/0173428 | A1* | 6/2023 | Sikka | F03D 9/22<br>95/113 |
| 2024/0024810 | A1* | 1/2024 | Sikka | F03D 80/00 |
| 2024/0093094 | A1* | 3/2024 | Jones | C10L 5/447 |
| 2024/0157299 | A1* | 5/2024 | Nulwala | B01D 53/1425 |

OTHER PUBLICATIONS

Hamilton, Nicholas, et al., "Statistical analysis of kinetic energy entrainment in a model wind turbine array boundary layer", Journal of Renewable and Sustainable Energy 4, (2012), 063105, 19 pages, https://doi.org/10.1063/1.4761921.

* cited by examiner

CARBON CAPTURE ENTRAINMENT SYSTEM AND METHOD

CROSS REFERENCE TO RELATED APPLICATIONS

This application claims the priority benefit of U.S. Provisional Patent application No. 63/426,888, filed Nov. 21, 2022, the contents of which is incorporated herein by reference in its entirety.

GOVERNMENT RIGHTS

This invention was made with government support under N00014-21-1-2624 awarded by the Office of Naval Research. The government has certain rights in the invention.

FIELD

The disclosure generally relates to carbon capture systems and, more particularly, to atmospheric carbon capture systems.

INTRODUCTION

This section provides background information related to the present disclosure which is not necessarily prior art.

Dispersed sources of carbon dioxide, such as transportation and agriculture, can be difficult to decarbonize for many reasons; logistical, societal, and/or financial. However, they make up nearly 40% of global anthropogenic $CO_2$ emissions and, thus, pose a significant barrier to carbon neutrality goals. To combat this, and account for the other countless carbon sources still present, Direct Air Capture (DAC) has been developed—which can remove carbon dioxide directly from ambient air.

The barrier, however, is cost. $CO_2$ is relatively diffuse in the atmosphere, with the average global surface concentration reported as 412.5 ppm by NOAA in 2020. For both deployment-ready DAC technologies—liquid solvent and solid sorbent, the $CO_2$-reacting substrate is mounted within a bank of fans which force air through the system. To obtain sufficient amounts of the diffuse $CO_2$ in a reasonable amount of time, expansive banks of these air contactors and fans are constructed which greatly increases both capital costs and the carbon footprint. The current lowest cost for capture is around \$100-200/ton of $CO_2$. But, as a byproduct and pollutant, $CO_2$ has a low market price (as low as \$3), though recent legislation has increased tax credits for capture to \$85/ton in an attempt to close this disparity. Reducing—or increasing the efficacy of—the costly contactor area is of the utmost importance to the future of DAC and its role in slowing the effects of climate change.

Accordingly, there is a continuing need for a system and a method that may increase the yield rate of a DAC plant by pairing wind turbines with carbon capture devices. Desirably, the energy efficiency of the carbon capture system may be enhanced or may be substantially self-sufficient.

SUMMARY

In concordance with the instant disclosure, the carbon capture system and a method that increases the yield rate of a DAC plant by pairing wind turbines with carbon capture devices has surprisingly been discovered. Desirably, the energy efficiency of the carbon capture system may be enhanced and/or may be substantially self-sufficient compared to known carbon capture systems and known DAC plants.

The carbon capture system is configured to optimize the capture of carbon dioxide. The carbon capture system includes a wind turbine, a direct-air capture (DAC) system, and a processor. The wind turbine may have a first location and/or a first position. The processor may be communicatively coupled to the DAC system. The processor may be configured to input carbon dioxide and wind velocity profiles incident on the wind turbine, execute an algorithm to determine at least one of a wind velocity and a concentration of the carbon dioxide in the wind turbine wake, and output a second location and/or a second position of the DAC system. The second location and/or the second position of the DAC system may be optimized to enhance the quantity of carbon dioxide captured from the wind turbine. For instance, a distance between the first location and the second location may be adjusted to enhance the capture of carbon dioxide. In another specific example, a height of the DAC system may be adjusted to dispose the DAC system in an optimized second position to enhance the capture of carbon dioxide.

In certain circumstances, the carbon capture system may be provided as a processor. The processor may be configured to input a wind turbine wake from a wind turbine having a first location and/or a first position. The processor may also execute an algorithm to determine at least one of a wind velocity and a concentration of carbon dioxide in the wind turbine wake. The processor may further output a second location and/or a second position of a direct-air-capture (DAC) system.

Various ways of using the carbon capture system are provided. For instance, a method may include a step of providing a wind turbine, a direct-air-capture (DAC) system, and a processor. The wind turbine may have a first location and/or a first position. The processor may be communicatively coupled to the DAC system. Next, the method may include inputting a wind turbine wake from the wind turbine. Then, an algorithm may be executed to determine a wind velocity and/or a concentration of the carbon dioxide in the wind turbine wake. Afterwards, a second location and/or a second position of the DAC system may be outputted.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 10:
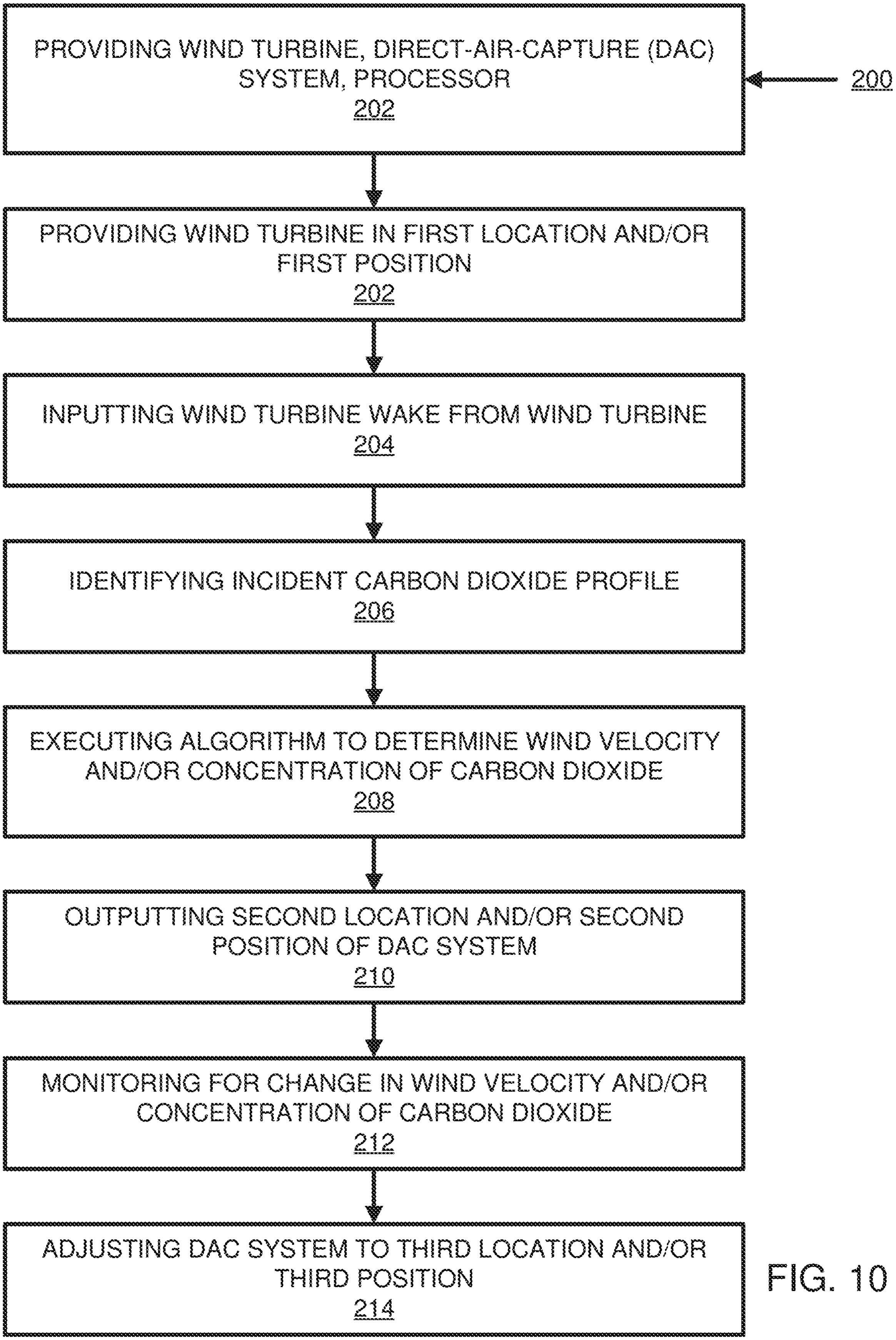
Figure 11:
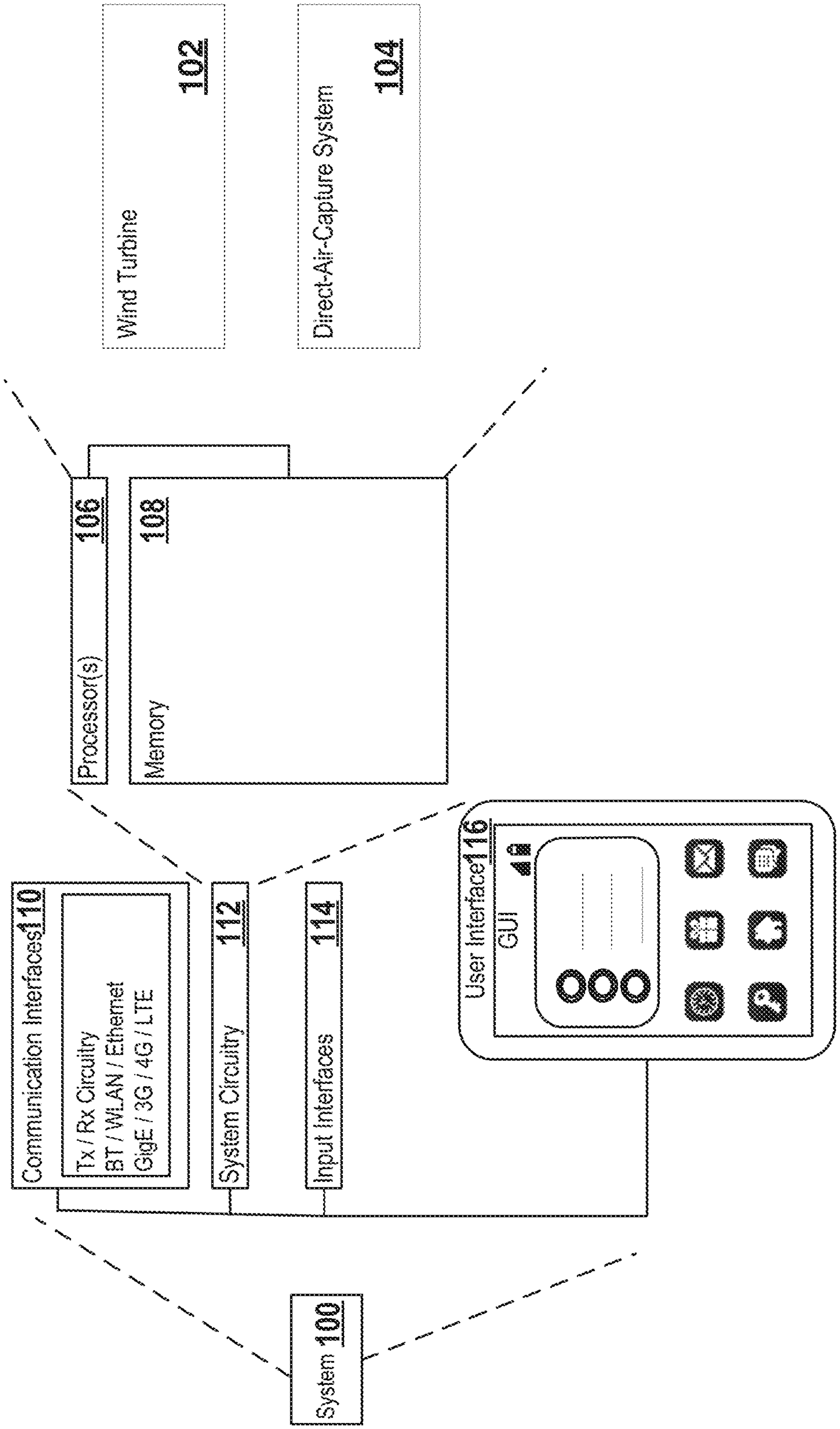

FIG. 10 is a flowchart depicting a method for using a carbon dioxide capture system, according to one embodiment of the present disclosure; and FIG. 11 is a schematic diagram of the carbon capture system, further depicting the system having a communication interface, an input interface, a user interface, and a system circuitry, wherein the system circuitry may include a processor and a memory, according to one embodiment of the present disclosure.

DETAILED DESCRIPTION

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below", or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
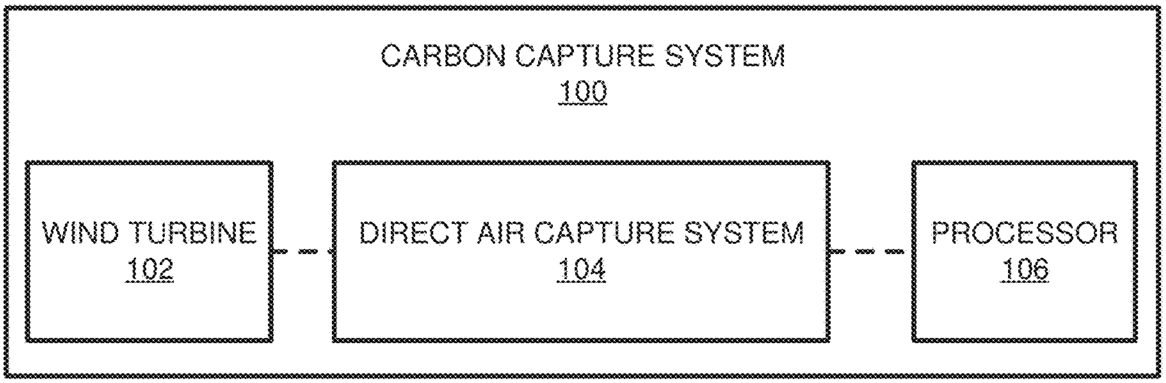
FIG. 1 is a box diagram illustrating a carbon dioxide capture system having a wind turbine, a direct-air-capture system, and a processor.
Figure 2:
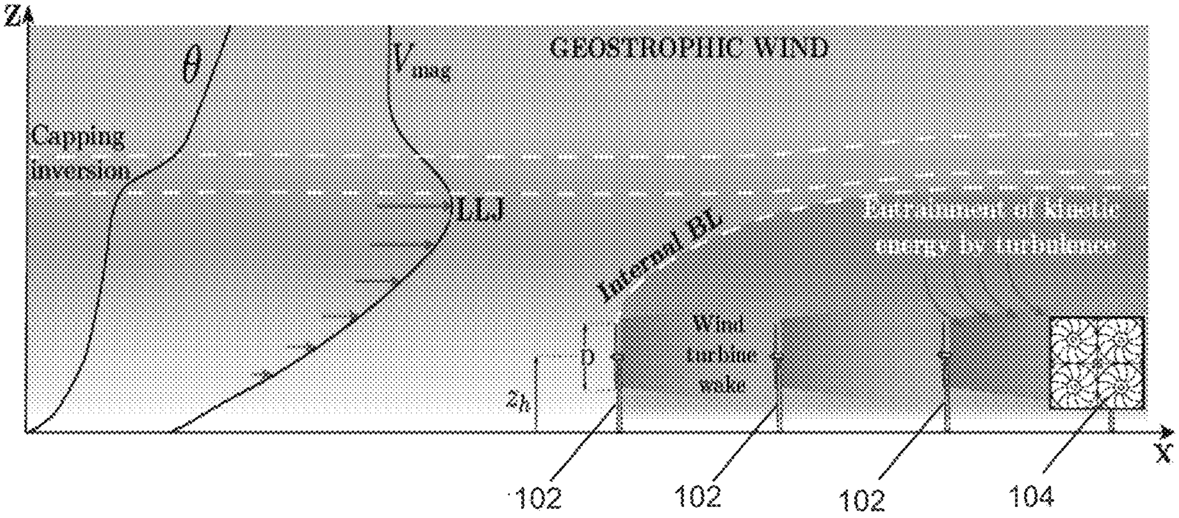
FIG. 2 is a schematic diagram of a carbon capture system, further depicting an entrapment of air from utilizing wind turbines toward a direct air capture system, according to one embodiment of the present disclosure.
Figure 3:
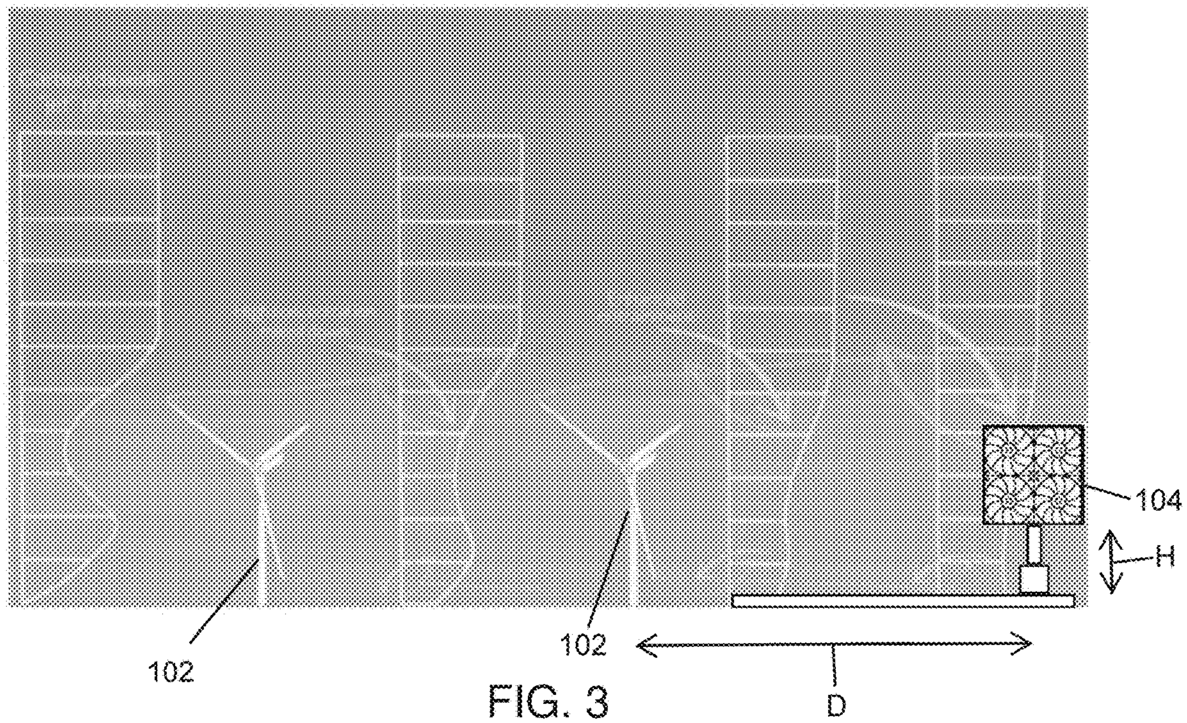
FIG. 3 is a schematic diagram of a wind turbine wake being concentrated and entrained through the use of wind turbines, according to one embodiment of the present disclosure.

As shown in FIGS. 2 and 3, the carbon capture system 100 is configured to optimize the capture of carbon dioxide. As shown in FIG. 1, the carbon capture system 100 includes a wind turbine 102, a direct-air capture (DAC) system 104, and a processor 106. The wind turbine 102 may have a first location and/or a first position. As a non-limiting example, locations discussed herein may include the placement of a component on a ground surface, such as a geographical coordinate. As another non-limiting example, positions discussed herein may include a height, angle, or orientation of a component, such as the components height above a ground surface. In a specific example, the wind turbine 102 may include a plurality of wind turbines. The processor 106 may be communicatively coupled to the DAC system 104. The processor 106 may be configured to input a carbon dioxide measurement from a wind turbine wake, execute an algorithm to determine at least one of a wind velocity and a concentration of the carbon dioxide in the wind turbine wake, and output a second location and/or a second position of the DAC system 104. The second location and/or the second position of the DAC system 104 may be optimized to enhance the quantity of carbon dioxide captured from the wind turbine 102. For instance, a distance between the first location and the second location may be adjusted to enhance the capture of carbon dioxide. In another specific example, a height of the DAC system 104 may be adjusted to dispose the DAC system 104 in an optimized second position to enhance the capture of carbon dioxide.

In certain circumstances, the processor 106 may be configured to continuously and/or semi-continuously monitor the carbon dioxide concentration in advance of the wind turbine 102. The processor 106 may particularly monitor the wind turbine wake for changes in concentration of carbon dioxide and/or velocity. Even more particularly, the concentration of the wind turbine wake may include determining the highest carbon dioxide content at a certain height H and a certain distance D downstream from the wind turbine 102. In a specific example, the processor 106 may continuously or semi-continuously monitor for a change in at least one of the wind velocity and the concentration of the carbon dioxide in the wind turbine wake In a specific example, the processor 106 may be further configured to adjust the second location and/or the second position of the DAC system 104 to a third location and/or third position in response to a change in the monitored wind turbine wake. For instance, as a non-limiting example, if the processor 106 detects the carbon dioxide content in the wake has changed, the processor 106 may adjust the height H of the DAC system 104 from thirty meters above a ground elevation to ten meters above the ground elevation. In another specific example, the processor 106 may be capable of adjusting the height H and/or the elevation of the DAC system 104 by utilizing a telescoping platform or structure. In other words, the DAC system 104 may include a telescoping platform that the processor 106 may adjust to move the DAC system 104 to one of the second position and the third position. The processor 106 may also be capable of adjusting the distance D between the wind turbine 102 and the DAC system 104 by utilizing a vehicle such as a track and a cart, an unmanned vehicle, and/or manually moving the DAC system 104 by a user. One skilled in the art may select other suitable methods of adjusting the second location and/or the second position of the DAC system 104 to a third location and/or third position, within the scope of the present disclosure.

In certain circumstances, the determination of the wind velocity and/or the concentration of the carbon dioxide in the wind turbine wake may be accomplished in various ways. For instance, the processor 106 may execute an algorithm. The algorithm may further include a computation of N-S and Scalar Transport r. In a specific example, the computation of N-S and Scalar Transport r may include:

$$\frac{\partial \overline{C}}{\partial t} + \frac{\partial}{\partial x_j}\left(\overline{u_j}\overline{C}\right) = -\frac{\partial}{\partial x_j}(J_j)$$

where C is the filtered concentration of the $CO_2$ and $J_j$ is the diffusion flux.

In a more specific example, the computation of N-S and Scalar Transport r may further include:

$$J_j = -\left(\frac{v_T}{Sc_T}\right)\frac{\partial \overline{C}}{\partial x_j}$$

where $S_{C_T}$ is turbulent Schmidt number ~1.0 and $v_T$ is the eddy viscosity (calculated from $k_r$ transport equation).

In certain circumstances, the wind turbine 102 may be coupled to the DAC system 104. For instance, the wind turbine 102 may be electrically coupled to the DAC system 104. In a specific example, the wind turbine 102 may partially or completely power the DAC system 104. Advantageously, the wind turbine 102 may partially or completely power the DAC system 104 as a renewable and/or a low-carbon energy source.

As shown in FIGS. 5-8D, the carbon capture system 100 may be used to determine certain parameters of a wind turbine wake such as carbon dioxide concentration and wind velocity. The information, as shown in FIGS. 6A-8D, may be repeated with any given $CO_2$ inlet profile, and for varying wind conditions. Accordingly, to optimize the efficiency and to enhance the effectiveness of carbon entrapment at a proposed DAC site, the carbon capture system 100 may be utilized to identify an averaged set of likely carbon profiles and parameters. This efficiency and effectiveness may be further enhanced by integrating certain unique parameters of the wind turbine 102, such as the size of the plant and/or the number of turbines required. These unique parameters of the wind turbine 102 may be accounted for when determining the second location and/or the second position of the DAC system 104. In a specific example, simulations may be run in various wind farm configurations and DAC positioning to identify which second location and/or second position creates an optimal case for sufficient power production and maximum carbon entrainment.

In certain circumstances, the DAC system 104 may include various types of DAC methodologies. For instance, the DAC system 104 may include liquid solvent and/or solid sorbent capture technologies. The DAC system 104 may also include passive capture technologies, such as carbon-sequestering cement, which could achieve their saturation point more quickly if provided a higher concentration of carbon dioxide. For instance, the DAC system 104 may be at least partially constructed from a cement that includes titanium dioxide configured to sequester carbon dioxide. Further, the DAC system 104 may include natural carbon capture methods such as photosynthesis, including biomass/biofuel feedstocks which benefit from increased $CO_2$. In other words, the DAC system 104 may have a photosynthesis system that includes one of a biomass and a biofuel feedstock. One skilled in the art may select other suitable DAC methodologies for the DAC system 104, within the scope of the present disclosure.

Figure 6A:
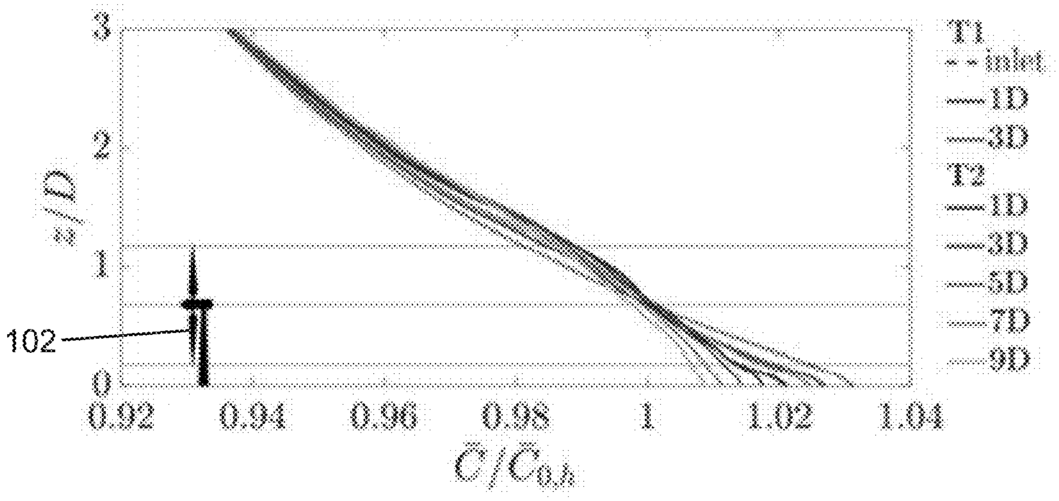
FIG. 6A is a line graph illustrating a carbon dioxide logarithmic profile through a turbine wake, according to one embodiment of the present disclosure.
Figure 6B:
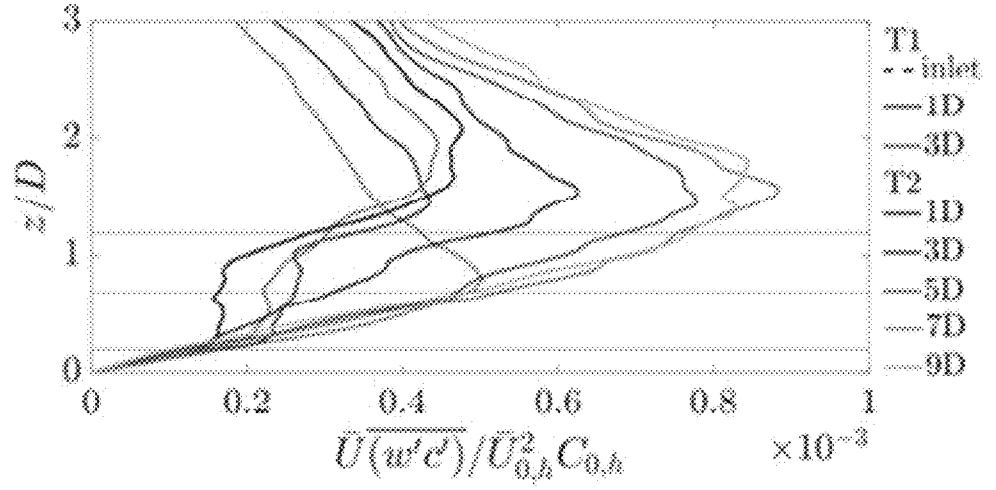
FIG. 6B is a line graph illustrating a carbon dioxide logarithmic profile after a passing through a turbine, according to one embodiment of the present disclosure
Figure 6C:
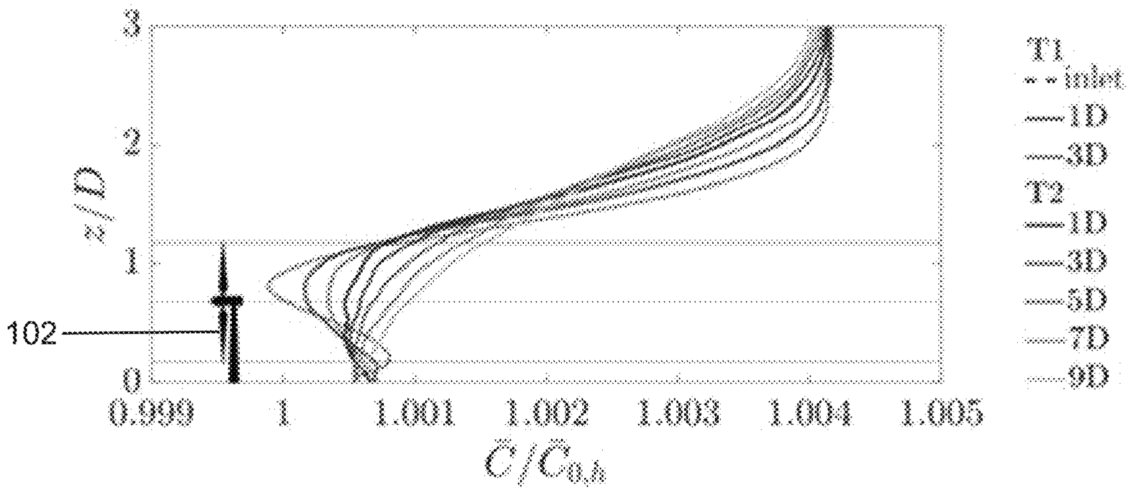
FIG. 6C is a line graph illustrating a carbon dioxide jet profile through a turbine wake, according to one embodiment of the present disclosure.
Figure 6D:
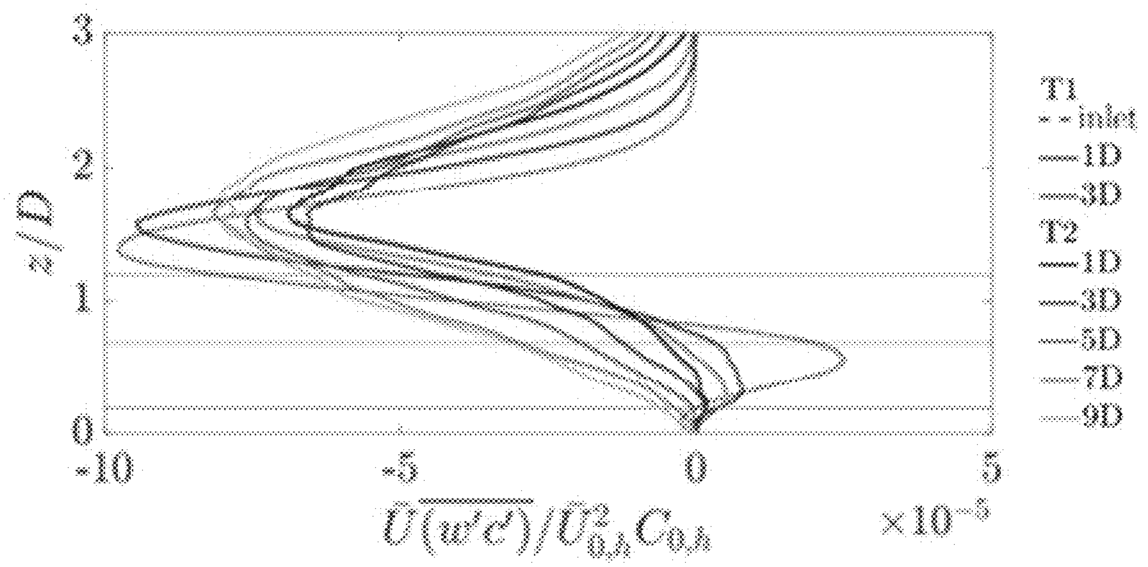
FIG. 6D is a line graph illustrating a carbon dioxide jet profile after a passing through a turbine, according to one embodiment of the present disclosure.
Figure 8A:
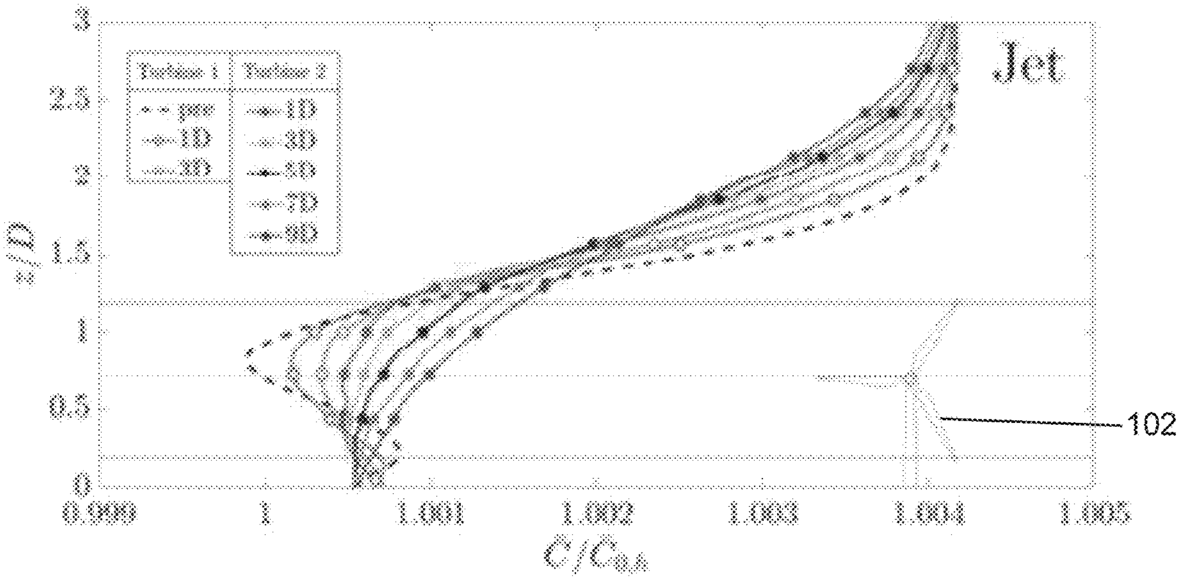
FIG. 8A is a line graph illustrating a carbon dioxide jet profile through a turbine wake, according to one embodiment of the present disclosure.
Figure 8B:
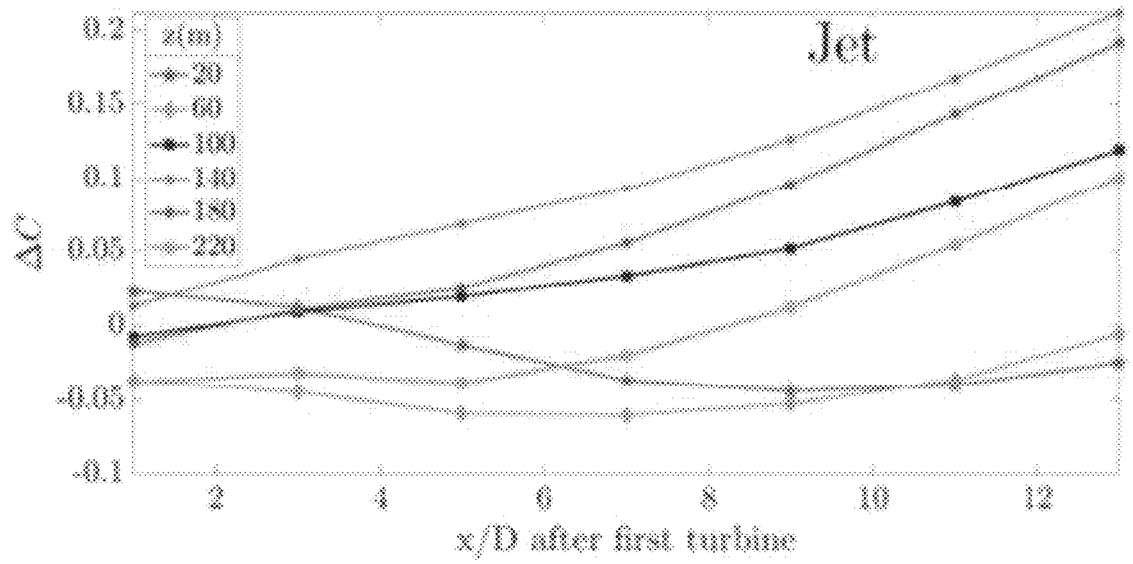
FIG. 8B is a line graph illustrating a change in carbon dioxide concentration through the jet turbine wake across various air column heights, as shown in FIG. 6A, according to one embodiment of the present disclosure.
Figure 8C:
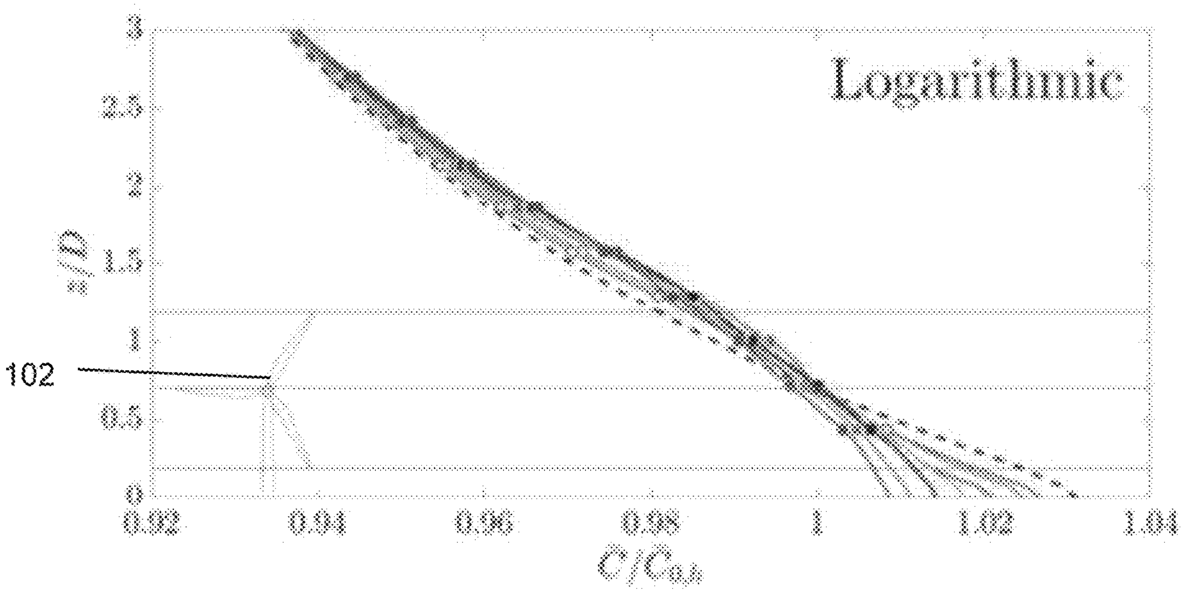
FIG. 8C is a line graph illustrating a carbon dioxide logarithmic profile through a turbine wake, according to one embodiment of the present disclosure.
Figure 8D:
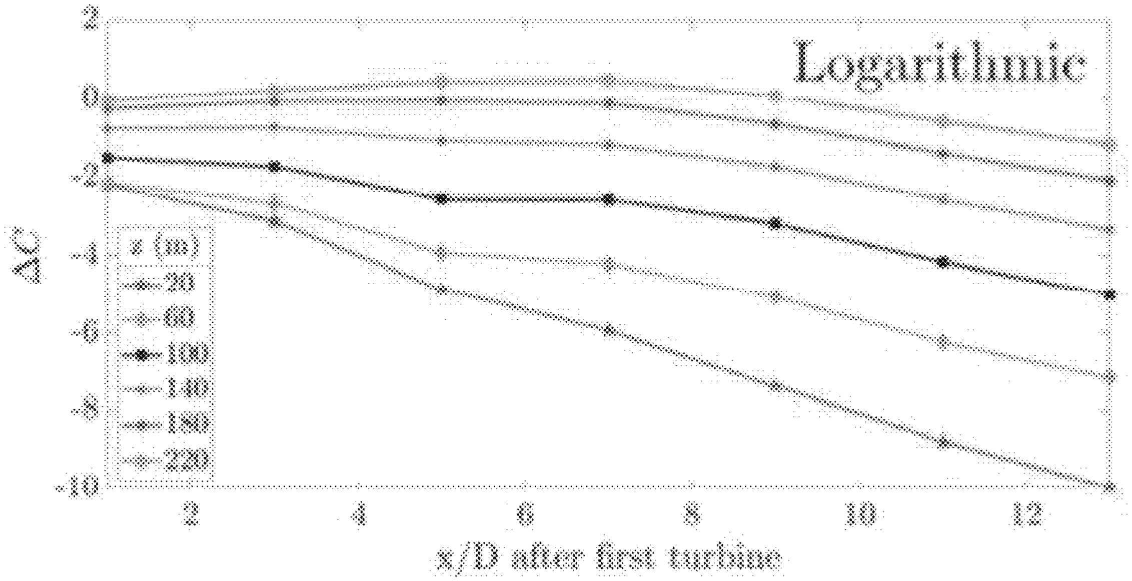
FIG. 8D is a line graph illustrating a change in carbon dioxide concentration through the logarithmic turbine wake across various air column heights, as shown in FIG. 5C, according to one embodiment of the present disclosure.

In certain circumstances, the carbon capture system 100 may also remove pollution from an environment, such as in a logarithmic $CO_2$ case, as shown in FIG. 8D. While the net mixing of the increased $CO_2$ away from the surface into higher parts of the atmosphere may make it more difficult to capture, it also decreases the amount of this pollutant at pedestrian heights. This may be utilized to begin decreasing harmful concentrations of other more toxic pollutants in cities and suburban areas. The pollutant removal capability of the carbon capture system 100 may operate in much the same way as shown in FIGS. 6C and 8A, but with the opposite desired effect; to expel excess pollutant concentrations out of the surface layer. In much the same way as other applications, potential sites would be analyzed to identify pollutant profiles and attempt to find a location optimal for this pollutant removal method.

In certain circumstances, the carbon capture system 100 may be provided as a processor 106. The processor 106 may be configured to input a carbon dioxide profile from a wind turbine 102 having a first location and/or a first position. The processor 106 may also execute an algorithm to determine at least one of a wind velocity and a concentration of carbon dioxide in the wind turbine wake. The processor 106 may further output a second location and/or a second position of a DAC system 104.

As shown in FIG. 11, the carbon-capture system 100 may further include a communication interface 110, a system circuitry 112, and/or an input interface 114. The system circuitry 112 may include the processor 106 or multiple processors. The processor 106 or multiple processors execute the steps to input a wind turbine wake from a wind turbine 102 and/or incident carbon dioxide profile, the wind turbine 102 having at least one of a first location and a first position, execute an algorithm to determine at least one of a wind velocity and a concentration of carbon dioxide in the wind turbine wake, and output at least one of a second location and a second position of a direct-air-capture (DAC) system. Alternatively, or in addition, the system circuitry 112 may include the memory 108.

The processor 106 may be in communication with the memory 108. In some examples, as shown in FIG. 11, the processor 106 may also be in communication with additional elements, such as the communication interfaces 110, the input interfaces 118, and/or the user interface 116. Examples of the processor 106 may include a general processor, a central processing unit, logical CPUs/arrays, a microcontroller, a server, an application specific integrated circuit (ASIC), a digital signal processor, a field programmable gate array (FPGA), and/or a digital circuit, analog circuit, or some combination thereof.

The processor 106 may be one or more devices operable to execute logic. The logic may include computer executable instructions or computer code stored in the memory 108 or in other memory that when executed by the processor 106, cause the processor 106 to perform the operations of the wind turbine 102 and the DAC system 104. The computer code may include instructions executable with the processor 106.

The memory 108 may be any device for storing and retrieving data or any combination thereof. The memory 108 may include non-volatile and/or volatile memory, such as a random-access memory (RAM), a read-only memory (ROM), an erasable programmable read-only memory (EPROM), or flash memory. Alternatively or in addition, the memory 108 may include an optical, magnetic (hard-drive), solid-state drive or any other form of data storage device. The memory 108 may be included in any component or sub-component of the system 100 described herein.

The user interface 116 may include any interface for displaying graphical information. The system circuitry 112 and/or the communications interface(s) 114 may communicate signals or commands to the user interface 116 that cause the user interface to display graphical information. Alternatively or in addition, the user interface 116 may be remote to the system 100 and the system circuitry 112 and/or communication interface(s) 114 may communicate instructions, such as HTML, to the user interface to cause the user interface to display, compile, and/or render information content. In some examples, the content displayed by the user interface 116 may be interactive or responsive to user input. For example, the user interface 116 may communicate signals, messages, and/or information back to the communications interface 114 or system circuitry 112.

The system 100 may be implemented in many different ways. In some examples, the system 100 may be implemented with one or more logical components. For example, the logical components of the system 100 may be hardware or a combination of hardware and software. In some examples, each logic component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each component may include memory hardware, such as a portion of the memory 108, for example, that comprises instructions executable with the processor 106 or other processor to implement one or more of the features of the logical components. When any one of the logical components includes the portion of the memory that comprises instructions executable with the processor 106, the component may or may not include the processor 106. In some examples, each logical component may just be the portion of the memory 108 or other physical memory that comprises instructions executable with the processor 106, or other processor(s), to implement the features of the corresponding component without the component including any other hardware. Because each component includes at least some hardware even when the included hardware comprises software, each component may be interchangeably referred to as a hardware component.

Some features are shown stored in a computer readable storage medium (for example, as logic implemented as computer executable instructions or as data structures in memory). All or part of the system 100 and its logic and data structures may be stored on, distributed across, or read from one or more types of computer readable storage media. Examples of the computer readable storage medium may include a hard disk, a flash drive, a cache, volatile memory, non-volatile memory, RAM, flash memory, or any other type of computer readable storage medium or storage media. The computer readable storage medium may include any type of non-transitory computer readable medium, such as a CD-ROM, a volatile memory, a non-volatile memory, ROM, RAM, or any other suitable storage device.

The processing capability of the system 100 may be distributed among multiple entities, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (for example, a dynamic link library (DLL).

All of the discussion, regardless of the particular implementation described, is illustrative in nature, rather than limiting. For example, although selected aspects, features, or components of the implementations are depicted as being stored in memory(s), all or part of the system or systems may be stored on, distributed across, or read from other computer readable storage media, for example, secondary storage devices such as hard disks and flash memory drives. Moreover, the various logical units, circuitry and screen display functionality is but one example of such functionality and any other configurations encompassing similar functionality are possible.

The respective logic, software or instructions for implementing the processes, methods and/or techniques discussed above may be provided on computer readable storage media. The functions, acts or tasks illustrated in the figures or described herein may be executed in response to one or more sets of logic or instructions stored in or on computer readable media. The functions, acts or tasks are independent of the particular type of instructions set, storage media, processor 106 or processing strategy and may be performed by software, hardware, integrated circuits, firmware, micro code and the like, operating alone or in combination. Likewise, processing strategies may include multiprocessing, multitasking, parallel processing and the like. In one example, the instructions are stored on a removable media device for reading by local or remote systems. In other examples, the logic or instructions are stored in a remote location for transfer through a computer network or over telephone lines. In yet other examples, the logic or instructions are stored within a given computer and/or central processing unit ("CPU").

Furthermore, although specific components are described above, methods, systems, and articles of manufacture described herein may include additional, fewer, or different components. For example, a processor 106 may be implemented as a microprocessor, microcontroller, application specific integrated circuit (ASIC), discrete logic, or a combination of other type of circuits or logic. Similarly, memories may be DRAM, SRAM, Flash or any other type of memory. Flags, data, databases, tables, entities, and other data structures may be separately stored and managed, may be incorporated into a single memory or database, may be distributed, or may be logically and physically organized in many different ways. The components may operate independently or be part of a same apparatus executing a same program or different programs. The components may be resident on separate hardware, such as separate removable circuit boards, or share common hardware, such as a same memory and processor for implementing instructions from the memory. Programs may be parts of a single program, separate programs, or distributed across several memories and processors.

Various ways of using the carbon capture system 100 are provided. For instance, as shown in FIG. 10, a method 200 may include a step 202 of providing a wind turbine 102, a direct-air-capture (DAC) system, and a processor 106. The wind turbine 102 may have a first location and/or a first position. The processor 106 may be communicatively coupled to the DAC system 104. Next, the method 200 may include inputting a wind turbine wake from the wind turbine 102. Then, an algorithm may be executed to determine a wind velocity and/or a concentration of the carbon dioxide in the wind turbine wake. Afterwards, a second location and/or a second position of the DAC system 104 may be outputted.

In certain circumstances, the method 200 may also include a step of identifying an incident carbon dioxide profile. In a specific example, the processor 106 may also monitor for a change in at least one of the wind velocity and the concentration of the carbon dioxide in the wind turbine wake. In another specific example, the processor 106 may adjust the DAC system 104 from at least one of the second location and the second position to at least one of a third location and a third position.

Figure 9:
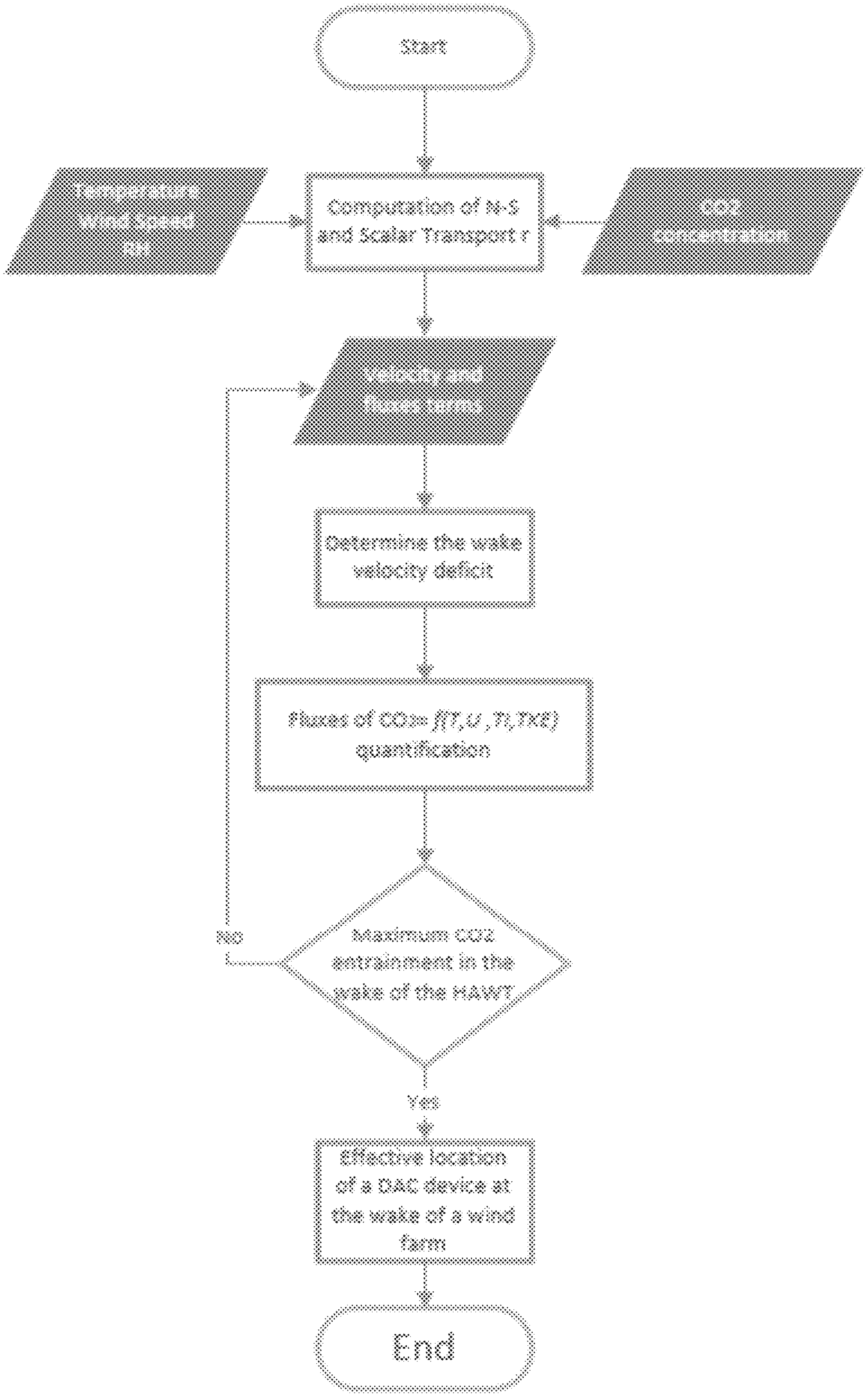
FIG. 9 is a flowchart illustrating a method of using the carbon capture system configured to identify a DAC system site that is enhanced for maximizing carbon capture.

In certain circumstances, the algorithm may include various computations. For instance, as shown in FIG. 9, the algorithm may include a computation of N-S and Scalar Transport r. The computation may further include refinement to account for wake velocity deficient and/or fluxes of carbon dioxide. A skilled artisan may select other suitable ways of calculating the optimal second location and/or second position of the DAC system 104, within the scope of the present disclosure.

Desirably, the carbon capture system 100 may enable a symbiotic relationship between a wind turbine 102 and a DAC system 104 for enhanced carbon sequestration. For instance, the wind turbine 102 may provide nearly carbon-free power, lower wind speeds, and, potentially, higher carbon concentrations. This potential, however, may be dependent on unique wind farm factors such as design, location, etc. These factors may be analyzed on a site-by-site basis to conclude the optimal siting to maximize this relationship. In other words, the carbon capture system 100 may more efficiently determine an optimal second location and/or second position of the DAC system 104 based on the proposed wind turbine's 102 specific design and location with the aim of increasing the efficacy of the wind turbine's 102 contactors and therefore, it's economic viability; all without an increase in capital cost of known carbon capture systems.

Advantageously, by powering the DAC system 104 with renewable or low-carbon energies, an enhanced net yield of carbon may be obtained. The energy consumption of plants are known to be around 8.8 GJ/ton of $CO_2$, using natural gas, or, alternatively, 5.5 GJ from natural gas and 366 kWh of electricity. Therefore, without adjusting the design of the plant (trading the gas turbine for a method compatible with a wind turbine), by powering the electricity component with wind energy, the natural gas usage drops by around 38%. Using a rough estimate for the natural gas emission rate for heating/power, this drop means the elimination of 0.18 tons of $CO_2$ emissions/ton of $CO_2$ captured, almost $1/5^{th}$ of the total captured $CO_2$.

As mentioned, the present disclosure offers potential benefits for the use of wind energy with the DAC system 104, such as carbon entrainment and pollution removal. Both additional benefits occur by making one minor change: the siting. Based on the meteorological conditions in the location and the wind farm design, there may be an optimal site for the DAC system 104—in the wake of the wind farm. This optimization stems from two mechanisms intrinsic to a wind turbine wake.

One is the wake velocity deficit, a patch of slower moving wind caused by the energy removed by the turbine. While this wake velocity deficit negatively impacts downwind turbines due to the decreased wind speeds and increased turbulence, it poses a benefit for DAC plants for these exact reasons. The optimal air speed for DAC systems 104 are known to be between 1-3 m/s (with their data sheet stating the lower end, 1.3 m/s). Known DAC plants are designed to be twenty meters in height, by which height, depending on the location, the wind speeds could certainly exceed 1-3 m/s.

Given a location and a turbine configuration, the present disclosure may determine optimal locations downstream of the turbine that are statistically more likely to obtain the optimal wind speed than in the freestream.

The final benefit relates to the fluxes of carbon dioxide. As a non-limiting example, fluxes of carbon dioxide were studied in the wake of a simplified wind farm, in a neutral atmospheric boundary layer. Three carbon dioxide profiles were chosen to emulate potential profiles that would be incident on a DAC plant; logarithmic, "jet", and, a base case, uniform (FIGS. 6A and 6B). NREL's SOWFA, a Large Eddy Simulation Software written to simulate wind turbines in atmospheric flows, was edited to track the transport of carbon dioxide and run for a simple case of 2 inline NREL-5MW turbines, placed 500 m apart.

Figure 7:
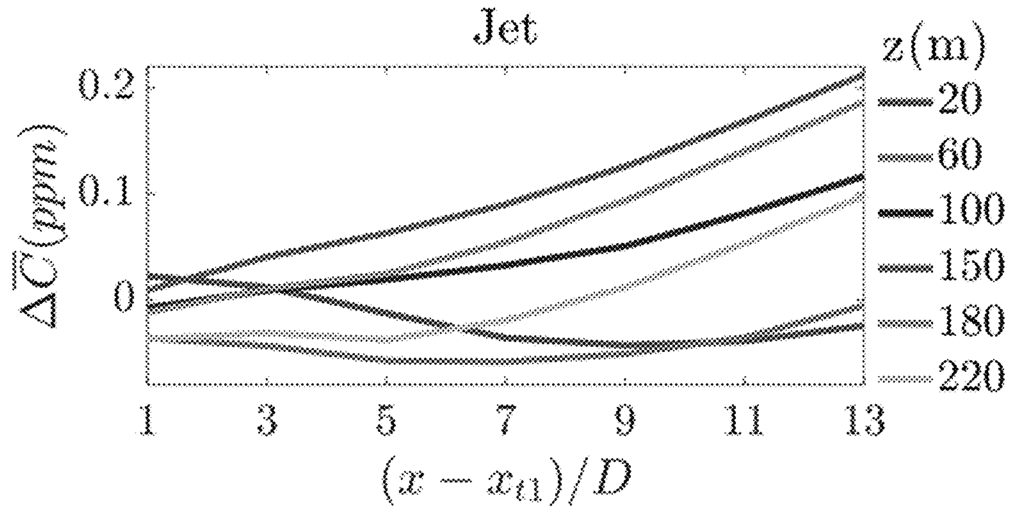
FIG. 7 is a line graph illustrating a change in carbon dioxide concentration through the jet turbine wake across various air column heights, as shown in FIG. 6A, according to one embodiment of the present disclosure.

With continued reference to the non-limiting example, it was found that the $CO_2$ fluxes in the wake of the turbines were highly dependent on the incident carbon dioxide profile, but that overall, the same mechanism remained. As expected, regardless of profile, the wind turbine 102 created turbulent mixing in its wake, resulting in the downwards entrainment of the air from above the turbine and upwards entrainment of the air from below, as shown in FIG. 7. In all cases, the effect was the most exaggerated in the farther part of the wake and was accelerated after the second turbine.

For the logarithmic profile, which shows decrease in concentration from ground level, this resulted in a net decrease in concentration below the turbine top tip, as lower concentration air is mixed down from above, as shown in FIGS. 8C and 8D, resulting in a loss of 2.5%. For the uniform case, the balanced circulation of like concentration resulted in no net change due to the turbine. However, for the "jet" profile, the wind turbine 102 mixed higher concentration air that had been trapped at a higher altitude down towards hub height, circulating the lower concentration air at hub height upwards, as shown in FIGS. 8A and 8B. This may result in an increase in the $CO_2$ concentration, simply as a byproduct of the wind energy process. $CO_2$ profiles with steeper, more monotonic gradients may result in higher rates of entrainment, as could greater numbers of turbines.

Advantageously, the present disclosure may provide a clean energy source for the DAC system 104, which desirably slows higher wind speeds down towards the optimal velocity for maximum plant efficiency, while potentially entraining down additional carbon dioxide for capturing.

Figure 4A:
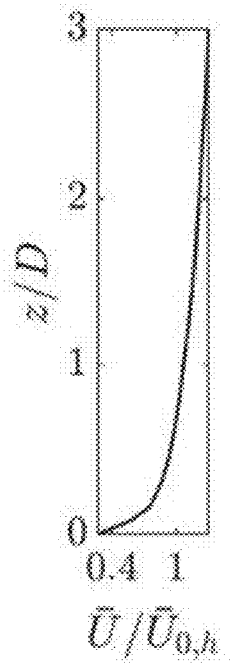
FIG. 4A is line graph illustrating an initial condition of a wind turbine wake having a streamwise wind speed and temperature, according to one embodiment of the present disclosure.
Figure 4B:
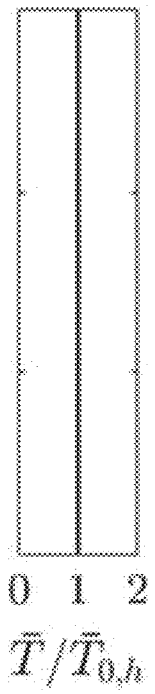
FIG. 4B is a line graph illustrating an initial condition of a wind turbine wake having a uniform stream pattern.
Figure 4C:
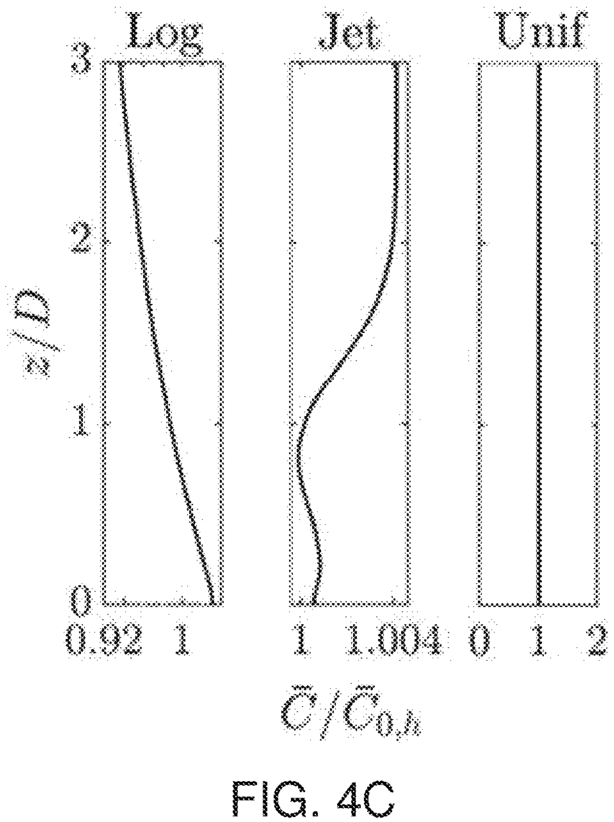
FIG. 4C illustrates line graphs of different carbon dioxide profiles including Empirical (or otherwise known as "jet"), Log, and Uniform, according to one embodiment of the present disclosure.
Figure 5:
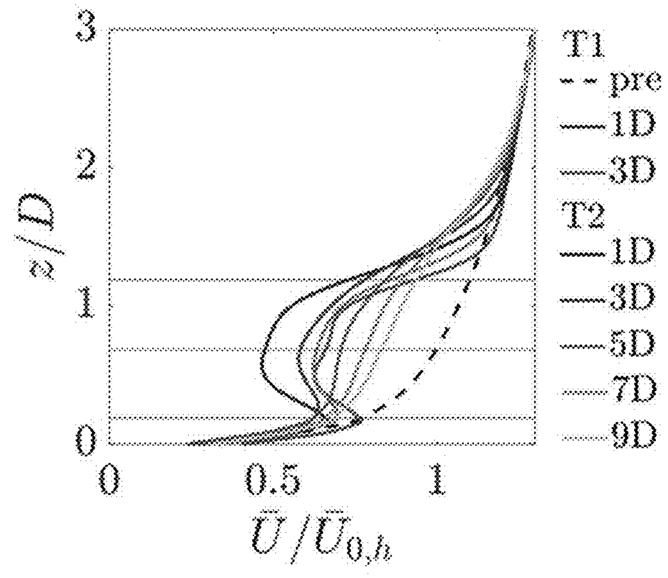
FIG. 5 is a line graph illustrating wind velocity evolution through a turbine wake, according to one embodiment of the present disclosure.

In certain circumstances, as shown in FIG. 4A-4C, the carbon capture system 100 may determine the carbon dioxide profile as a jet profile, a logarithmic profile, or a uniform profile. In a specific example, the processor 106 may also determine if the carbon dioxide profile changes diurnally, seasonally, and/or annually. This determination may be based on many factors specific to the siting selection such as upwind emission sources and sinks, wind direction and speed, their variability, latitude/longitude, etc. One skilled in the art may select other suitable factors for determining the carbon dioxide profile, within the scope of the present disclosure.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A carbon-capture system configured to optimize the capture of carbon dioxide, the system comprising:

- a wind turbine having at least one of a first location and a first position;
- a direct-air-capture (DAC) system;
- a processor communicatively coupled to the DAC system, the processor configured to:
  - receive sensor data representative of at least one of a wind velocity and a carbon dioxide concentration associated with a wind turbine wake of the wind turbine;
  - execute an algorithm using the sensor data to determine at least one of a wind velocity and a concentration of the carbon dioxide in the wind turbine wake; and
  - control operation of the direct-air-capture (DAC) system to cause adjustment of at least one of a location and a position of the DAC system responsive to at least one of the determined wind velocity and the carbon dioxide concentration.

2. The carbon-capture system of claim 1, wherein the wind turbine includes a plurality of wind turbines.

3. The carbon-capture system of claim 1, wherein the processor continuously monitors for a change in at least one of the wind velocity and the concentration of the carbon dioxide in the wind turbine wake.

4. The carbon-capture system of claim 3, wherein the processor is further configured to move the DAC system from at least one of the second location and the second position to at least one of a third location and a third position.

5. The carbon-capture system of claim 4, wherein the DAC system includes a telescoping platform that the processor adjusts to move the DAC system to one of the second position and the third position.

6. The carbon-capture system of claim 4, wherein the DAC system includes a vehicle that the processor adjusts to move the DAC system to one of the second location and the third location.

7. The carbon-capture system of claim 1, the wind turbine is electrically coupled to the DAC system.

8. The carbon-capture system of claim 7, wherein the wind turbine powers the DAC system.

9. The carbon-capture system of claim 1, wherein the DAC system is at least partially constructed from carbon-sequestering cement.

10. The carbon-capture system of claim 1, wherein the DAC system is at least one of a liquid solvent and a solid sorbent capture system.

11. The carbon-capture system of claim 1, wherein the DAC system is a photosynthesis system that includes one of a biomass and a biofuel feedstock.

12. A system comprising a processor, the processor configured to:

receive sensor data representative of at least one of a wind velocity and a carbon dioxide concentration associated with a wind turbine wake of a wind turbine;

execute an algorithm to determine at least one of the wind velocity and the concentration of carbon dioxide in the wind turbine wake; and control a direct-air-capture (DAC) system to cause adjustment of at least one of a location and a position of the DAC system in response to the at least one of the determined wind velocity and the carbon dioxide concentration.

13. A method of using a carbon-capture system configured to optimize the capture of carbon dioxide, the method comprising the steps of:

providing a wind turbine, a direct-air-capture (DAC) system, and a processor, the wind turbine having at least one of a first location and a first position, the processor communicatively coupled to the DAC system;

receiving, via the processor, sensor data representative of at least one of a wind velocity and a carbon dioxide concentration associated with a wind turbine wake of the wind turbine;

executing, by the processor, an algorithm to determine at least one of the wind velocity and the concentration of the carbon dioxide in the wind turbine wake; and controlling, by the processor, operation of the direct-air-capture (DAC) system to physically adjust at least one of a location and a position of the DAC system responsive to at least one of the determined wind velocity and the carbon dioxide concentration.

14. The method of claim 13, further comprising a step of identifying an incident carbon dioxide profile.

15. The method of claim 13, further comprising a step of monitoring for a change in at least one of the wind velocity and the concentration of the carbon dioxide in the wind turbine wake via the processor.

16. The method of claim 13, further comprising a step of adjusting the DAC system from at least one of the second location and the second position to at least one of a third location and a third position.

17. The system of claim 1, wherein the processor is further configured to detect changes in the wind turbine wake and repeatedly adjust at least one of the location and the position of the DAC system in response to the detected changes.

18. The system of claim 1, wherein adjustment of the DAC system increases exposure of an air intake of the DAC system to a region of the wind turbine wake having elevated carbon dioxide concentration.

19. The system of claim 1, wherein adjusting at least one of the location and the position of the DAC system includes positioning the DAC system downstream of the wind turbine and at a height selected based on the identified wind turbine wake.

20. The system of claim 1, wherein adjusting at least one of the location and the position of the DAC system includes using at least one of a platform, a vehicle, and a structural support mechanism.

* * * * *